United States Patent [19]
Nozaki

[11] Patent Number: 5,167,383
[45] Date of Patent: Dec. 1, 1992

[54] STOL AIRCRAFT

[76] Inventor: Yoshio Nozaki, No. 89, Saiwai-cho, Inazawa-shi, Aichi-ken, Japan

[21] Appl. No.: 557,809

[22] Filed: Jul. 26, 1990

[51] Int. Cl.⁵ .............................. B64C 9/28
[52] U.S. Cl. ..................... 244/12.5; 244/207; 244/214; 244/216; 244/55
[58] Field of Search .............. 244/12.5, 23 D, 207, 244/210, 211, 214, 216, 55

[56] References Cited

U.S. PATENT DOCUMENTS

| | | | |
|---|---|---|---|
| 1,895,388 | 1/1933 | Gheorghe | 244/12.5 |
| 3,724,784 | 4/1973 | von Ohain et al. | 244/207 |
| 3,893,638 | 7/1975 | Kelley | 244/12.5 |
| 3,920,203 | 11/1975 | Moorehead | 244/23 D |
| 4,117,995 | 10/1978 | Runge | 244/207 |

FOREIGN PATENT DOCUMENTS

| | | | |
|---|---|---|---|
| 2081393 | 2/1982 | United Kingdom | 244/65 |
| 2203710 | 10/1988 | United Kingdom | 244/55 |

OTHER PUBLICATIONS

"Allison Propfan Development Centers on Gearbox Design" AW&ST, Stanley Kandebo pp. 46–47 Dec. 23, 1985.

*Primary Examiner*—Charles A. Marmor
*Assistant Examiner*—Carla Mattix
*Attorney, Agent, or Firm*—Fred Philpitt

[57] ABSTRACT

A STOL aircraft includes propfan engines which are each connected to a lower surface of one of the wings by a pylon. The propfan engine is located directly below the wing and are each equipped with fans at a rear portion thereof. A slat is connected to a leading edge of the wing and not divided by any object, including the pylon and the propfan engine.

2 Claims, 5 Drawing Sheets

STOL AIRCRAFT

FIELD OF THE INVENTION

This invention relates to an STOL aircraft.

BACKGROUND OF THE INVENTION

So far there have been three principle types of short takeoff and landing modes:

One is the externally blown flap mode. FIGS. 5 and 6 depict an STOL aircraft which employs this mode. According to this mode, a high lifting capability is obtained by directing gas 8 discharged from a jet engine 15 against flaps 17 connected to the trailing edge of a wing 18. This mode provides a lift coefficient of 6.0. The STOL aircraft of FIGS. 5 and 6 is YC-15 developed in the United States. This mode will hereinafter be referred to as an "EBF mode".

Another is the rearward-stream deflecting mode. FIGS. 7 and 8 depict an STOL aircraft which employs this mode. According to this mode, a high lifting capability is obtained by steeply deflecting an airstream behind a propeller 21 downwardly by a flap 22 connected to the trailing edge of a wing 24. This mode provides a lift coefficient of 5.7 to 6.5. The STOL aircraft of FIGS. 7 and 8 is PS-1 developed in Japan.

The other is the upper surface blowing mode. FIG. 9 depicts a STOL aircraft which employs this mode. For this mode, an exhaust duct 27 for a turbofan engine 26 is located on the upper surface of a wing 25. According to this mode, gas 28 discharged from the turbofan engine 26 flows along the upper surface of the wing 25 and along the upper surfaces of flaps 29 connected to the trailing edge of the wing 25. This mode provides a lift coefficient of 6.0. The STOL aircraft of FIG. 9 is YC-14 developed in the United States. This mode will hereinafter be referred to as a "USB mode".

However, since all the foregoing three conventional STOL modes require the provision of high lift systems, the foregoing STOL aircraft are inferior in their payload-carrying capacities to a conventional takeoff and landing aircraft (CTOL aircraft).

Hence, the conventional STOL aircraft are not of a practical nature.

The rearward-stream deflecting mode of FIGS. 7 and 8 is not suitable for a high-speed flying for the following reason: The airstream behind the propeller 21, accelerated by the propeller 21, collides with the leading edge of the wing 24 (FIG. 8). The speed at which the airstream behind the propeller 21 flows is approximately 1.8 times the flying speed of the aircraft when the airstream is flowing immediately behind the propeller 21. Therefore, if the propeller 21 is located further away from the leading edge of the wing 24, the airstream behind the propeller 21 collides with the leading edge of the wing 24 at a speed which is approximately mach 0.15 higher than the flying speed of the aircraft. Thus, the rearward-stream deflecting mode is not suitable for an aircraft which is required to fly at a speed obtainable immediately before the wing produces a shock wave, that is, at approximately mach 0.8. The maximum economical flying speed of an aircraft is delimited by the shock wave which is produced by the wing. FIG. 13 depicts increases in the coefficient $C_D$ of the drag produced by air, in relation to the flying speed M (mach). FIG. 13 shows that, no matter what the ratio of the profile thickness to the chord length is, the aircraft is subjected to a large drag when the aircraft is flying with the range from mach 0.80 to mach 0.85. Thus, the rearward-stream deflecting mode only provides a flying speed of mach 0.65 to mach 0.70.

With the USB mode, the gas discharged from the turbofan engine 26 first turns upwardly for some 8 degrees and then turn downwardly for some 8 degrees and then flows along the upper surface of the wing 25. Hence, an exhaust nozzle 32 of a core engine 31 is specially formed. That is, the exhaust nozzle 32 is turned upwardly for some 8 degrees. Also, an exhaust duct 27 is bent accordingly and, hence, part of the energy is lost. In addition, the gas discharged from the exhaust duct 27 causes a friction on the upper surface of the wing 25, thus reducing the thrust of the engine.

Thus, neither of the rearward-stream deflecting mode and the USB mose is capable of effective function.

SUMMARY OF THE INVENTION

It is the object of the invention to provide an STOL aircraft which employs the EBF mode and which has about 2.3 times the payload-carrying capacity of a conventional STOL aircraft employing the same mode and is capable of a flying speed of mach 0.80 to mach 0.85. This flying speed compares favorably with the flying speed of a CTOL aircraft.

In other words, the object of the invention is to improve the conventional EBF-type STOL aircraft of FIGS. 5 and 6.

In addition, the invention may be applied to a CTOL aircraft to more than double its payload-carrying capacity.

DETAILED DESCRIPTION OF A PREFERRED EMBODIMENT

Figure 1:
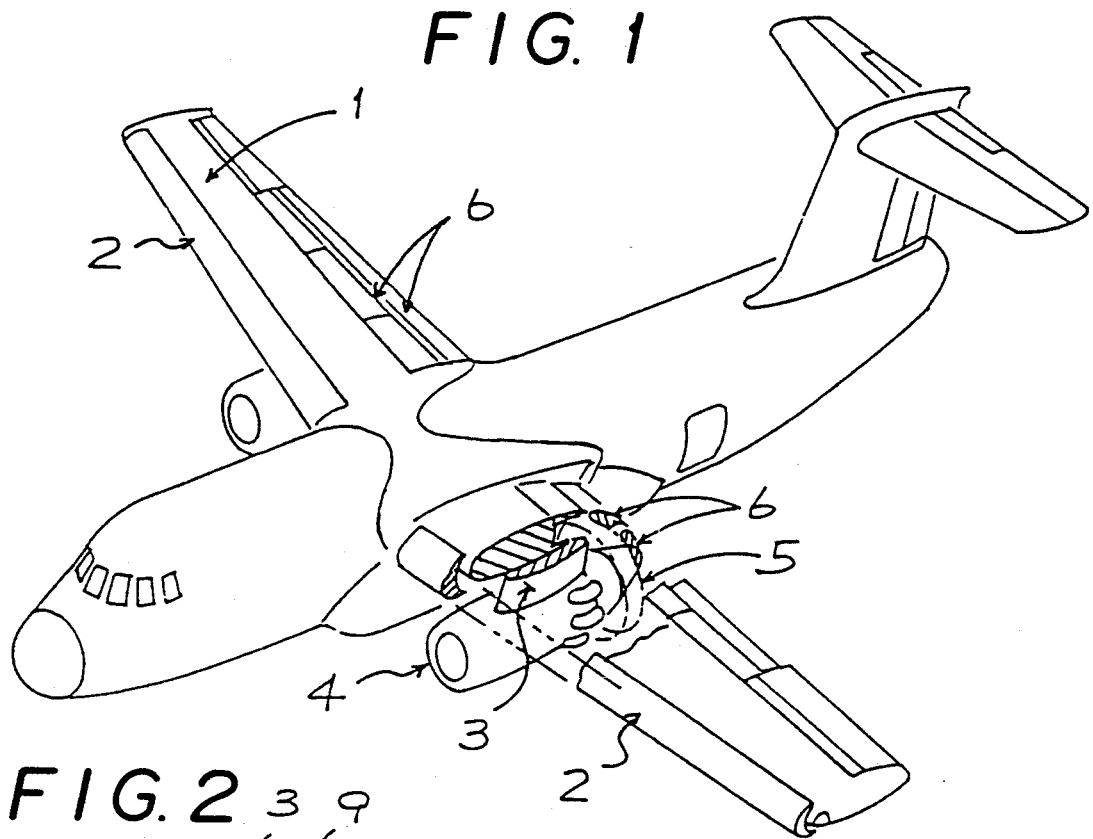
FIG. 1 is a perspective view of an STOL aircraft constructed according to the invention.

An STOL aircraft of the invention will now be described in detail with reference to the drawing.

Figure 2:
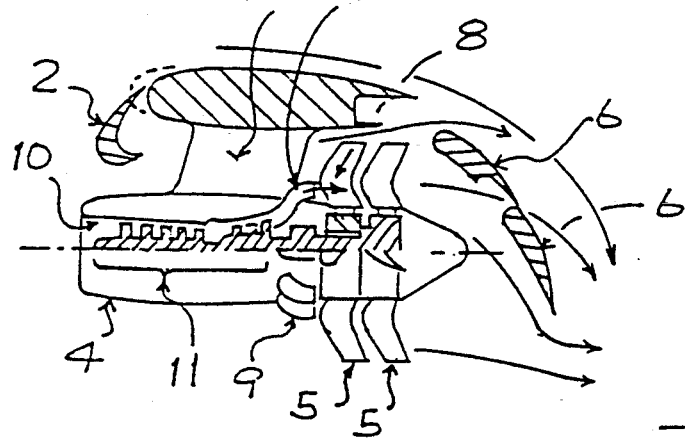
FIG. 2 illustrates how a propfan engine of the aircraft of FIG. 1 is connected to the wing thereof.

It appears that a propfan engine will be put to practical use before long. A propfan engine is provided by equipping a turboprop engine with a propeller with a sweepback angle. The STOL aircraft of the invention employs an afterfan-type propfan engine 4 which includes fans 5 located behind a core engine 11 (FIGS. 1 and 2). An afterfan-type turbofan engine so far has been produced on an experimental basis, but has not been put to practical use since a large amount of fuel gas leaks both from the fan and from the rotating outer surface of the engine. Hence, only a front-fan type turbofan engine 15 of FIG. 4 has been put to practical use.

The manufacture of a fan with a sweepback angle was made possible by the development of a technique for processing titanium alloy and a composite material, and the possibility of using such a fan has made it possible to put the propfan engine 4 (FIG. 2) to practical use. A flight test of a B727 passenger aircraft equipped with a GE36 propfan engine was made and, as a result, a propulsion efficiency of 84% and a bypass ratio of 35 were obtained at a flying speed of mach 0.8. Also, the passenger aircraft attained a flying speed of mach 0.84 at an altitude of 30,000 feet. The invention takes advantage of the afterfan-type propfan engine and a bypass ratio of as high as 35 to provide the following remarkable effect.

Figure 3:
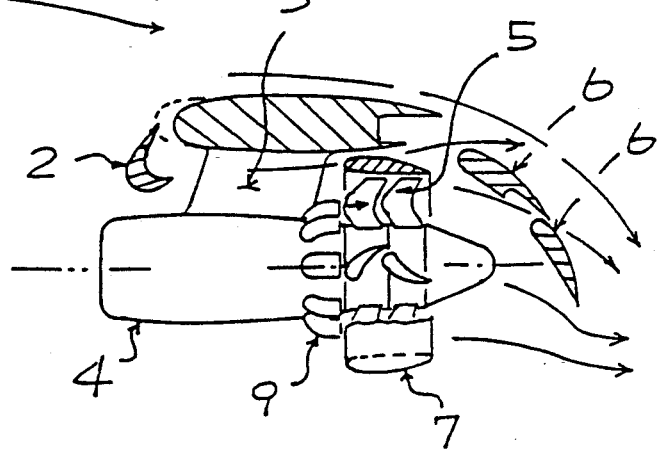
FIG. 3 depicts a modification of the construction of FIG. 2 where fans smaller than those of FIG. 2 are used, the circumferential area around the fans is enclosed by a duct 7, and a pylon shorter than that of FIG. 2 is used. With the construction of FIG. 3, gas from the propfan engine 4 runs against a flap 6 in a greater amount.
Figure 5:
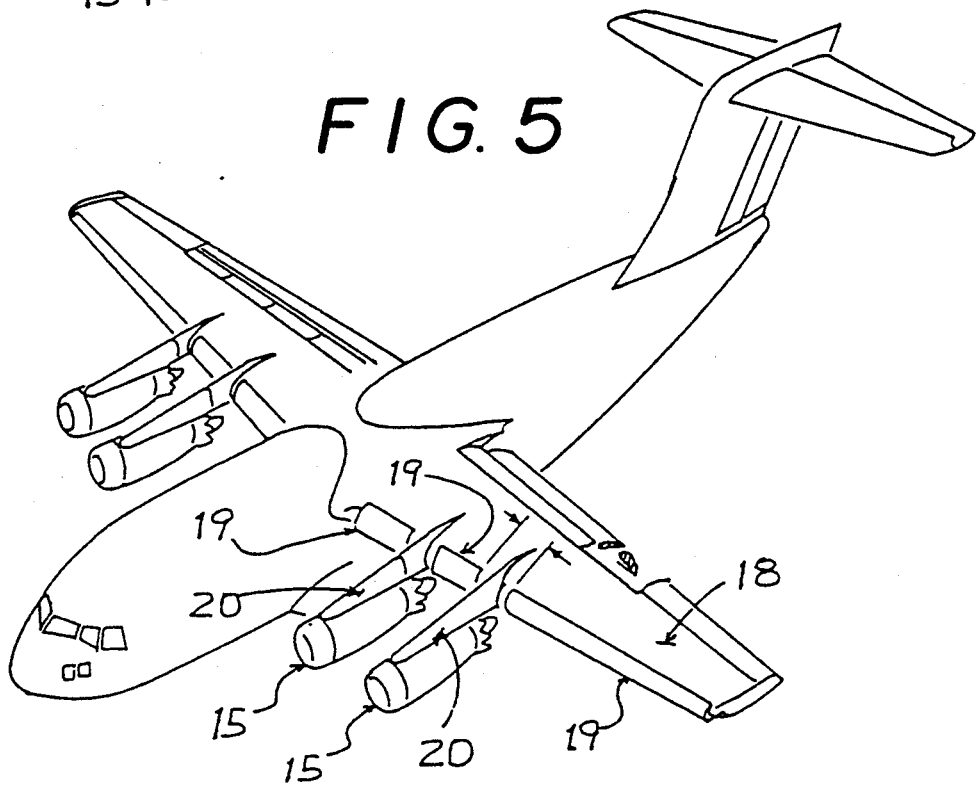
FIG. 5 is a perspective view of an STOL aircraft employing the conventional EBF mode.
Figure 6:
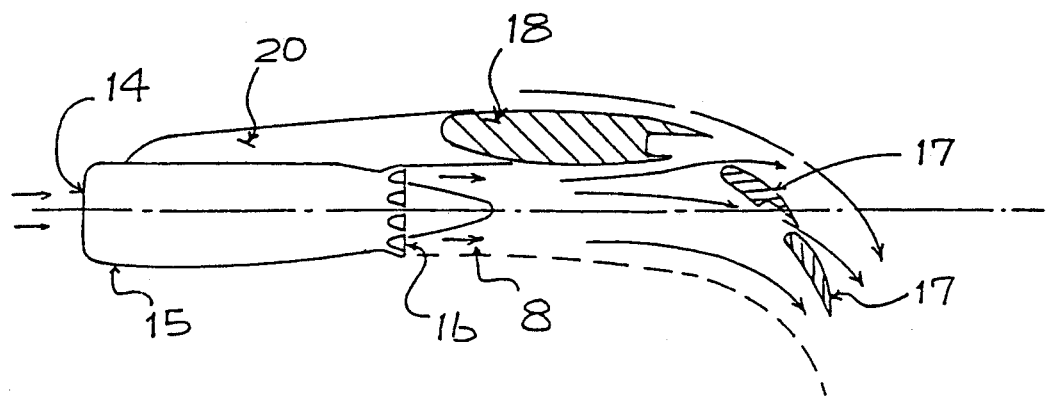
FIG. 6 depicts a portion of the aircraft of FIG. 5.
Figure 7:
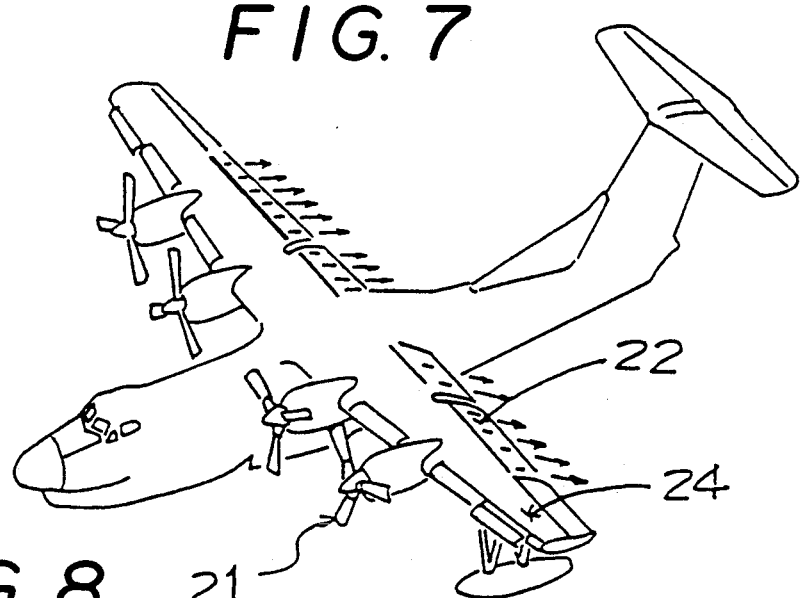
FIG. 7 is a perspective view of an STOL aircraft employing the rearward-stream deflecting mode.
Figure 8:
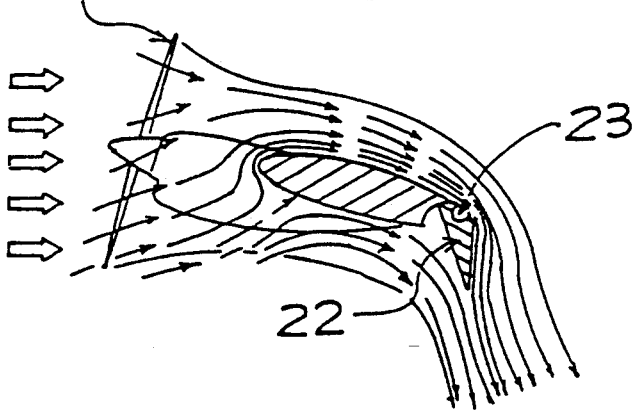
FIG. 8 shows a portion of the aircraft of FIG. 7.
Figure 9:
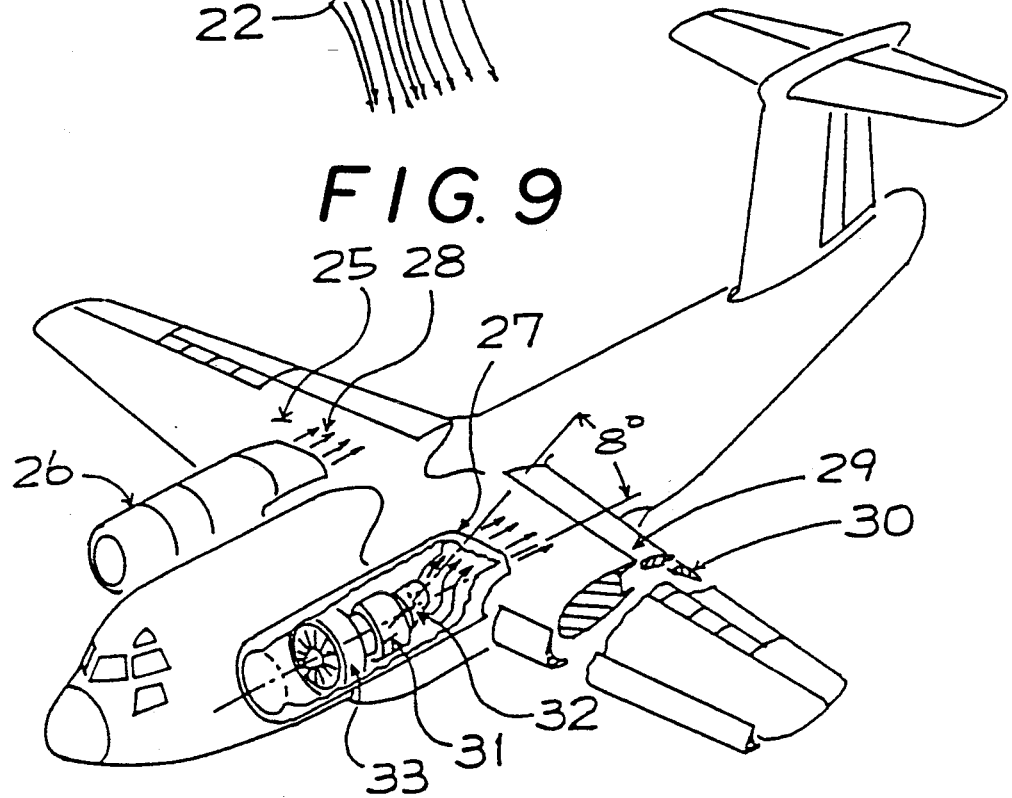
FIG. 9 is a perspective view of an STOL aircraft employing the upper surface blowing mode.

The high bypass ratio of 35 results in the fans 5 (FIGS. 1 to 3) producing an airstream which, unlike the gas discharged from the turbofan engine 15 of FIGS. 5 and 6, is of a low temperature and of a constant low rate. This characteristic is suitable for the construction where flaps 6 are located immediately behind the fans 5 (FIGS. 1 and 3).

Referring to FIG. 2, an exhaust gas 8 from the core engine 11 is mixed with the atmosphere by the fans 5 at a bypass ratio of 35. The exhaust gas 8 initially has a temperature of approximately 600 degrees. However, since the exhaust gas 8 is mixed with the atmosphere in the ratio of 1 (exhaust gas) to 35 (atmosphere), the temperature of the exhaust gas 8 is reduced to less than 100 degrees. The mixture is well agitated by the fans 5, and is discharged rearwardly of the fans 5 at such a low temperature. With the construction of FIG. 2, the greater part of the exhaust gas 8 moves rearwardly and goes against the flaps 6. If desired, the circumference of the whole of the fans 5 may be surrounded with a duct 7, as shown in FIG. 3, to provide a thrust more efficiently. That is, in such a case, the duct 7 prevents the slightest amount of exhaust gas 8 from dissipating in the radial directions, so that all of the exhaust gas 8 moves rearwardly and can go against the flaps 6. Consequently, in such a case, one may reduce the size of the fan 5 as shown in FIG. 3 while at the same time providing the same magnitude of thrust as in FIG. 2. In such a case one may reduce the size of the fan 5 without losing the magnitude of thrust provided by the construction of FIG. 2. Also, the duct 7 serves to reduce the noise of the engine 4. Thus, according to the invention, flaps 6 may be located immediately behind the fans 5.

The YC-15 aircraft of FIGS. 5 and 6 has a turbofan engine 15 (JT-8D) with a bypass ratio of 0.99. Therefore, a mixture 8 of a combustion gas (with a temperature of approximately 600 degrees) and the atmosphere in the ratio of substantially 1 to 1 is discharged from the exhaust nozzle 16 at a temperature of more than 350 degrees. Thus, it is necessary to space the exhaust nozzle 16 sufficiently away from the flap 17 and, hence, the engine 15 projects from the wing 18 for a considerable length. Therefore, the slat 19 is divided to connect the pylons 20 to the wing 18. In addition, gas is discharged from the exhaust nozzle 16 at a rate of approximately mach 500 per second even when the aircraft is not moving. When it is considered that the flap of a CTOL aircraft is subjected to an airstream flowing at a speed which is equal to approximately 130 per cent of the takeoff and landing speed, an STOL aircraft which employs the conventional EBF mode is placed under an additional necessity to space the exhaust nozzle 16 further away from the flap 17. With the STOL aircraft which employs the conventional EGB mode, the slat 19 is divided into three by the pylons 20. Hence, gaps G are present between the slat portions. The presence of the gaps G keeps the slat 19 from providing high lift.

However, according to the invention, since neither the propfan engine 4 nor a pylon 3 interferes with a slat 2, the slat 2 need not be divided. This advantage of the invention will be described in detail below.

As described below, due to the bypass ratio of 35 the temperature of the exhaust gas 8 from the core engine 11 falls to less than 100 degrees. Also, thanks to the bypass ratio of 35 the exhaust gas 8 is discharged from the fans 5 at a low speed. Therefore, the fans 5 may be located in close proximity to the flaps 6. In other words, the propfan engine 4 may be located in close proximity to the flaps 6.

The propfan engine 4 is connected to the lower surface of the wing 1 by means of the pylon 3.

Figure 4:
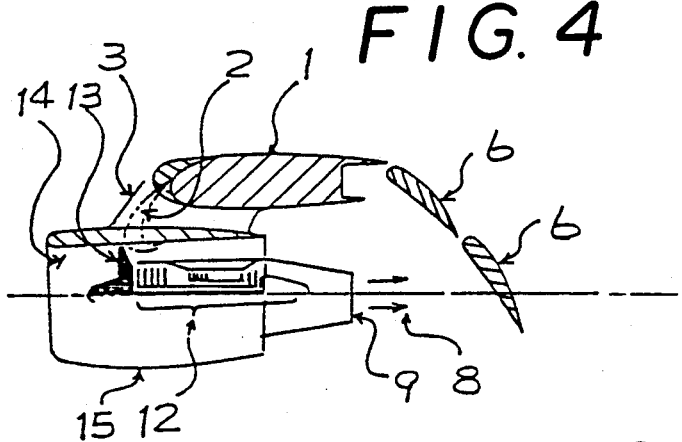
FIG. 4 shows a conventional front-fan type turbofan engine located below the wing.

An air-intake 10 of the propfan engine 4 has a much smaller outside diameter than the air-intake 14 of the turbofan engine 15 of FIGS. 4, 5 and 6. It is not possible to reduce the air-intake 14 of the turbofan engine 15 to the same size as the air-intake 10 since a low-pressure fan 13 with a large diameter is located immediately behind the air-intake 14. The necessity to provide such a large fan 13 comes from the necessity to have a high bypass ratio to provide the engine with a high propulsion efficiency and a high combustion efficiency. Thus, as shown in FIG. 4, if the turbofan engine 15 is located below the wing 18 likewise in the invention, the engine 15 interferes with the slat 2 when the slat 2 is extended, or tilted. Hence, if the engine 15 is located below the wing, the slat 2 must be divided to avoid such an interference. If the engine 15 is located in a lower position than illustrated in FIG. 4 below the wing 18 in order to avoid such an interference, it is not necessary to divide the slat 2, but the exhaust gas 8 from the engine 15 does not run against the flaps 17. Thus it is not possible to locate the engine 15 below the wing 18 without producing an inexpedient result. With the propfan engine 4, since no fan is provided immediately behind the air-intake 10, the air-intake 10 is small. The fans 15 with large diameters are located in the rear part of the engine 4 and, hence, does not necessitate the air-intake 10 to be made large.

Thus, when the slat 2 is extended, or tiled, the propfan engine 4 does not interfere with the movement of the slat 2. Therefore, it is not necessary to divide the slat 2. Hence, the STOL aircraft of the invention is free from a serious drawback of the conventional STOL aircraft of FIGS. 5 and 6, namely, a reduction of lift due to the division of the slat 19.

Figure 10:
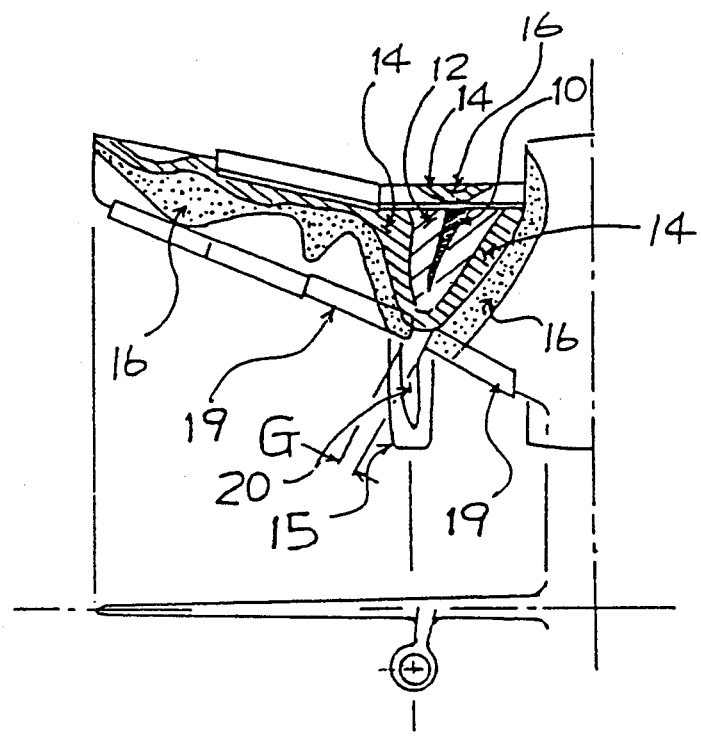
FIG. 10 shows that the presence of a gap G in a slat results in stalling the aircraft.
Figure 11:
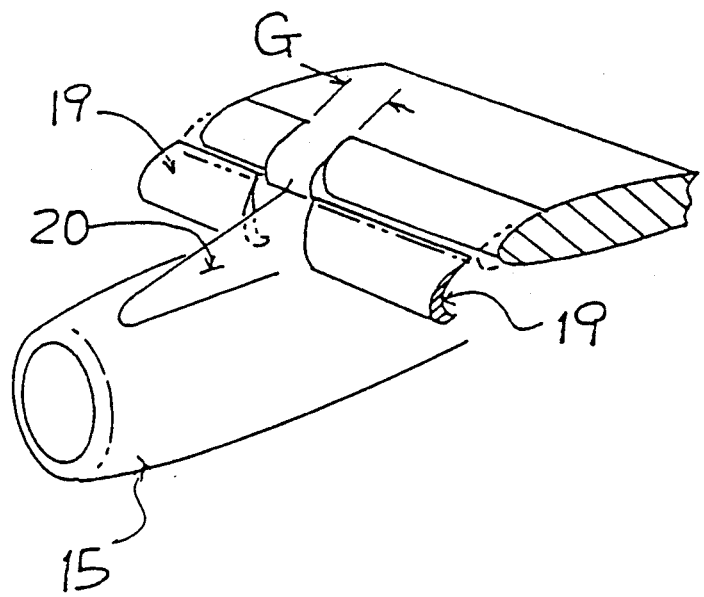
In FIG. 11 a slat is divided to connect a pylon to the wing.
Figure 12:
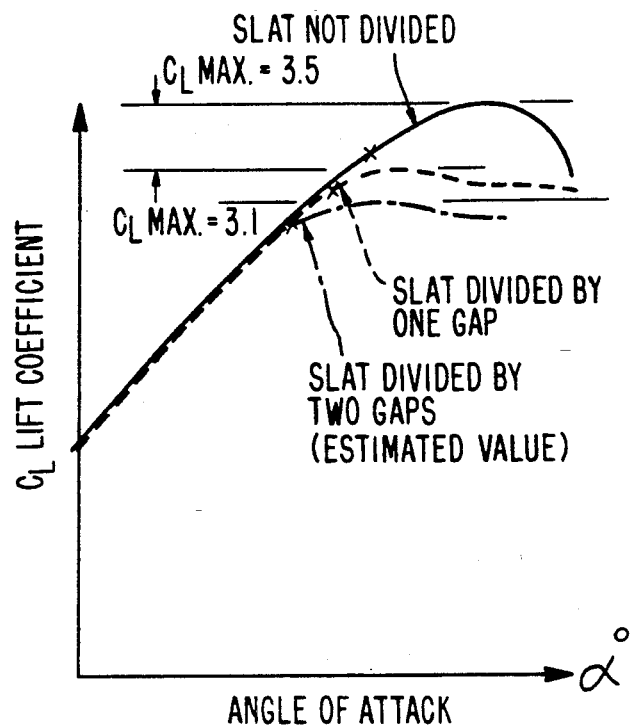
FIG. 12 shows the relation between the angle of attack of a wing having an undivided slat and the lift coefficient of such a wing, as well as the relation between the angle of attack of a wing having a slat which is divided by one gap G and the lift coefficient of such a wing.
Figure 13:
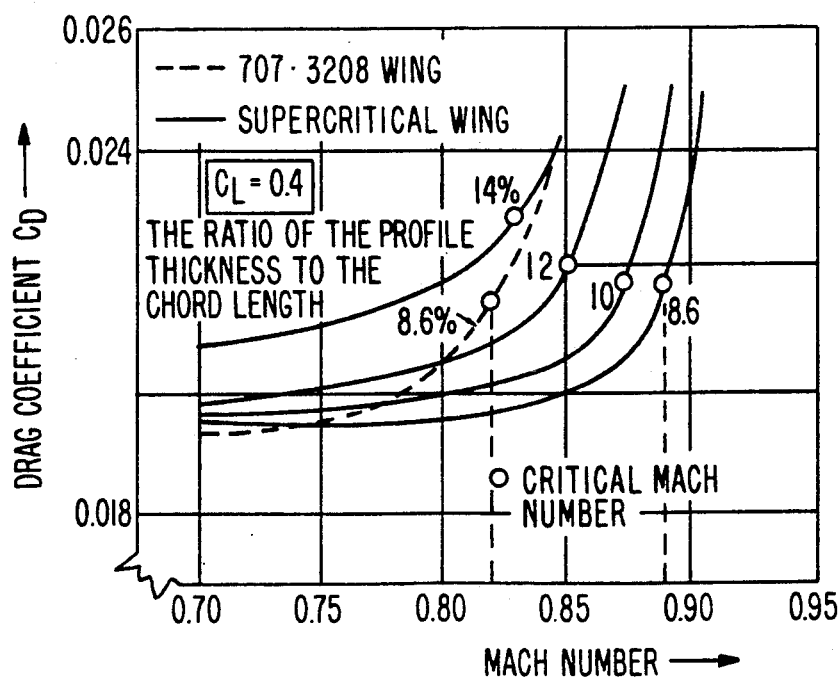
FIG. 13 depicts increases in the coefficient $C_D$ of the drag produced by air, in relation to a flying speed M (mach).

FIGS. 10 and 12 illustrate how lift decreases due to the division of the slat 19 of FIG. 5. With the conventional EBF mode (FIG. 5), the slat 19 and the flap 17 are extended or tilted, and the angle of attack is made large to provide high lift. However, a large angle of attack results in producing an eddy on the upper surface of the wing and, hence, in a loss of the lift. Therefore, the slat 19 introduces a large amount of air onto the upper surface of the wing and inhibits an eddy from being produced in order to provide high lift. However, with the conventional EBF mode (FIG. 5), since the slat 19 is divided, high lift is not provided. FIG. 10 shows that the presence of a gap G (produced by the division of the slat 19) results in stalling the aircraft even when the angle of attack is small (see The Institute of Aeronautics and Space Journal, Vol. 22, No. 248). In FIG. 10, the patterns on the wing are different portions of the wing which are stalled by different angles of attack, and the numbers 10, 12 14 and 16 are the angles of attack which cause the different portions of the wing to stall. As shown in FIG. 10, the portion of the trailing edge of the wing which is directly behind the gap G stalls when the angle of attack is 10 degrees, while the other portions of the wing do not stall until the angle of attack becomes 16 degrees. Thus, with the invention, since the slat 2 is not divided, the wing 1 does not stall until the angle of attack becomes 6 degrees or greater than the angle of attack which causes the wing of the conventional EBF mode STOL aircraft (FIG. 5) to install. Hence, the invention provides lift which is 10% or more greater than the lift provided by the conventional EBF mode.

FIG. 12 shows the relation between the angle of attack of a wing A having an undivided slat and the lift coefficient of the wing A, as well as the relation between the angle of attack of a wing B having a slat which is divided by one gap G and the lift coefficient of the wing B. The wing A is that of a C-1 transport plane (CTOL aircraft) developed in Japan. Since the wing of the C-1 transport plane has a slat and a double-slot flap of the same model as the wing of the STOL aircraft of FIG. 5, it is considered that the C-1 transport plane has substantially the same lift coefficient as the STOL aircraft of FIG. 5. A flight test of a C-1 transport plane has shown that the wing of the transport plane has a lift coefficient of $C_{L\ MAX}$ 3.1 (see page 82 of the April 1979 issue of Aeronautical Journal). FIG. 12 shows that the wing A has a lift coefficient of $C_{L\ MAX}$ 3.5. Thus, the lift coefficient $C_{L\ MAX}$ 3.1 of the wing B is approx. 11% smaller than that of the wing A. It is estimated from experiences that a wing with a slat divided (into three) by two gaps, such as shown in FIG. 5, has an approx. 17% smaller lift coefficient than the wing A, i.e., a lift coefficient $C_{L\ MAX}$ of approx. 2.9. From an opposed point of view, the lift coefficient of the wing 1 of the invention is approx. 20% greater than that of a wing with a slat divided by two gaps.

With the conventional EBF mode (FIG. 5), the slat 19 is divided into three by two gaps G, and the lift coefficient is 6.0. It is considered that this lift coefficient is the sum of the lift coefficient $C_{L\ MAX}$ 2.9 of the wing itself and the lift obtained by downwardly deflecting the exhaust gas 8 from the turbofan engine 15 by the flaps 17. Thus, the lift coefficient provided by the invention is the sum of the lift coefficient $C_{L\ MAX}$ 3.5 of the wing 1 and the lift coefficient $C_{L\ MAX}$ 3.1 (6.0−2.9) obtained by downwardly deflecting the exhaust gas 9 from the fan 5 by the flap 6. That is, the lift coefficient provided by the invention is 6.6. Hence, the lift coefficient provided by the invention is 10% higher than that provided by the conventional EBF mode.

The increase of 10% in lift coefficient results in an increase of 80% in payload, as described below.

The following are data as to the conventional EBF mode (of FIG. 5):

| | |
|---|---|
| Maximum takeoff weight | 98,286 KG |
| Payload (with STOL) | 12,244 KG |
| Payload (with CTOL) | 28,123 KG |
| Wing area | 161.65M |
| Fuel capacity | 23,700 KG |

In this specification the term "maximum takeoff weight" is used to mean the greatest possible weight of the aircraft which still allows it to take off. The above data show that the payload of the YC-15 aircraft of FIG. 5 when it makes short takeoff and landing accounts for 12.5% of its maximum takeoff weight, while the payload thereof when it makes conventional takeoff and landing accounts for 28.6% of its maximum takeoff weight. According to the invention, the increase of 10% in lift coefficient results in an increase of 10%, or 9,829 KG, in maximum takeoff weight. The value of 9,829 KG is equal to 80% of the payload of the aircraft of FIG. 5 when it makes short takeoff and landing, i.e., 12,244 KG. Thus, according to the invention, the use of an undivided slat results in an increase of 80% in payload over the Conventional EBF mode.

In addition, the propfan engine 4 of the invention has a higher propulsion efficiency than the JT-8D turbofan engine used for the YC-15 aircraft, and consumes a smaller amount of fuel than the JT-8D turbofan engine by approx. 25% when the propfan engine 4 is generating the same thrust as the JT-8D turbofan engine (see page 30 of No. 278 of "Aircraft Technology" published by the Association of Aircraft Technology). Thus, with a less consumption of fuel than the YC-15 aircraft, the aircraft of the invention provides the same thrust and the same duration of flight as the YC-15 aircraft. Thus, if the aircraft of the invention only has a smaller fuel capacity than the YC-15 aircraft by 25%, or 5,925 KG, the aircraft of the invention provides a thrust and a duration of flight which are not lower than those of the YC-15 aircraft. Twenty-five (25) per cent of the fuel capacity of the YC-15 aircraft, or 5,925 KG, may be used to increase the payload. As shown above, the payload of the YC-15 aircraft when it makes short takeoff and landing is 12,244 KG. The value of 5,925 KG is equal to 48.4% of 12,244 KG. accounts for 12.5% of its maximum takeoff weight, while the payload thereof when it makes conventional takeoff and landing accounts for 28.6% of its maximum takeoff weight. Thus, with regard to the STOL mode, the aircraft of the invention may have 2.3 times the payload of the YC-15 aircraft, or may have a 128% greater payload than the YC-15 aircraft.

The invention may also be applied to construct a CTOL aircraft. Description will now be given of meritorious effects which the invention may have on a CTOL aircraft.

Besides having the foregoing features, the propfan engine 4 of the invention has weighty fans 5 at its rear end, and has a center of gravity more rearwardly than the conventional turbofan engine 15 of FIG. 4. Thus, the pylon 3 may be connected to the rear portion of the turbofan engine 4. Thus, although there is the necessity to locate the air intake 10 forwardly of the leading edge of the wing because of the area rule and the ram pressure, the pylon 3 does not interfere with the slat 2 (FIGS. 2 and 3). As described above, a wing with an undivided slat provides a 20% higher lift coefficient than a wing with a slat divided by two gaps, or $C_{L\ MAX}$ 3.5.

As described before, the lift coefficient 6.0 provided by the conventional EBF mode (FIG. 5) is the sum of the lift coefficient $C_{L\ MAX}$ 2.9 of the wing 18 itself and the lift obtained by downwardly deflecting the exhaust gas 8 from the turbofan engine 15 by the flaps 17. Thus, if the lift coefficient of the wing itself is increased by 20%, the lift coefficient of the whole aircraft increases only by approx. 10%. With regard to a CTOL aircraft, its lift is provided only by the wing; in other words, the lift provided by the wing is the lift of the aircraft. Therefore, if the lift coefficient of the wing of a CTOL aircraft is increased by 20%, both the lift of the aircraft and the maximum takeoff weight thereof increase by 20%. If the increase of 20% in the maximum takeoff weight is used to increase the payload, a remarkable effect which will be described below will be produced.

With regard to a CTOL aircraft, a 20% increase in the lift coefficient of its wing means a 20% increase in its maximum takeoff weight. When making the conventional takeoff and landing, the YC-15 aircraft provides the following values:

As shown before, the maximum takeoff weight of the YC-15 aircraft is 98,286 KG. A 20% increase in the maximum takeoff weight is an increase of 19,657 KG. The value of 19,657 KG is equal to a 70% increase in the payload (28,123 KG) when the aircraft makes the conventional takeoff and landing. When both the mechanical strength necessary to withstand a 20% increase in the maximum takeoff weight and an increase in the construction weight due to an increase in the volume of the body which is necessary to accommodate the increase in the payload are subtracted from the above apparent increase of 70% in the payload, an increase of about 50% to 60% in the payload will result. The propfan engine 4 of the invention has a approx. 25% higher propulsion efficiency than the engine(JT-8D turbofan engine) of the YC-15 aircraft. Thus, the fuel consumption, or fuel capacity (23,700 KG), of the aircraft may be reduced by 25% (5,925 KG) without reducing the duration of flight. Thus, when the payload is increased by 5,925 KG, the apparent increase in the payload is 21% (5,925/28,123). When the foregoing apparent increase of 70% is added to the increase of 21%, the total apparent increase in the payload is 91%. And when both an increase in the mechanical strength due to the increase in the payload and an increase in the construction weight due to an increase in the volume of the body are subtracted from the total apparent increase in the payload, a net increase of about 70% to 80% in the payload is provided. In addition, with conventional CTOL aircraft such as B-52 and B-767, a flap not slanting downwardly is used to prevent gas from the engine running against the flap. This necessity results in a reduction in lift.

According to the invention, if desired, a Krueger flap may be used as a slat. The use of a Krueger flap may contribute to reduce the cost of manufacture of the aircraft of the invention and, at the same time, to reduce the possibility of a trouble being developed.

What is claimed is:

1. A STOL aircraft comprising a fuselage and two wing and engine arrangements, each wing and engine arrangement including
    (a) a wing having an under surface, an upper surface, a leading edge and a trailing edge,
    (b) a slat having inner and outer ends that are on the leading edge of said wing and which extends along substantially the entire length of said wing, said slat being uninterrupted between its inner and outer ends by either a pylon, a propfan engine or any other object,
    (c) a pylon extending downwardly from the under surface of said wing at a point on the under surface of said wing which is intermediate said inner and outer ends of said slat,
    (d) a propfan engine mounted on the lower portion of said downwardly extending pylon, said engine having fans on its rear portion that discharge the greater part of engine exhaust gases rearwardly,
    (e) at least one flap connected to the trailing edge of said wing and being positioned so that the gases flowing rearwardly from said fans can flow directly against said at least one flap.

2. A STOL aircraft according to claim 1 which includes a duct surrounding the circumference of the whole of said fans to discharge all of said engine exhaust gases rearwardly.

* * * * *